(12) United States Patent
Guzelgoz et al.

(10) Patent No.: US 9,825,799 B2
(45) Date of Patent: *Nov. 21, 2017

(54) METHOD AND APPARATUS FOR DISCARDING UNUSED POINTS FROM CONSTELLATION MAPPING RULE USING TRANSCEIVER PROCESSING HARDWARE ("TPH")

(71) Applicant: Cavium, Inc., San Jose, CA (US)

(72) Inventors: Sabih Guzelgoz, San Jose, CA (US); Hong Jik Kim, San Jose, CA (US)

(73) Assignee: CAVIUM, INC., San Jose, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 14/678,836

(22) Filed: Apr. 3, 2015

(65) Prior Publication Data

US 2016/0294600 A1 Oct. 6, 2016

(51) Int. Cl.
*H04W 4/00* (2009.01)
*H04L 27/34* (2006.01)
*H04L 1/00* (2006.01)
*H04L 5/00* (2006.01)

(52) U.S. Cl.
CPC ........ *H04L 27/3483* (2013.01); *H04L 1/0042* (2013.01); *H04L 1/0054* (2013.01); *H04L 5/0055* (2013.01); *H04L 5/0057* (2013.01)

(58) Field of Classification Search
CPC ... H04L 1/0042; H04L 1/0054; H04L 5/0055; H04L 5/0057; H04L 27/3483

USPC .......................................................... 370/329
See application file for complete search history.

(56) References Cited

U.S. PATENT DOCUMENTS

| | | | |
|---|---|---|---|
| 2010/0189051 A1* | 7/2010 | Li ............ | H04L 27/345 370/329 |
| 2011/0176443 A1* | 7/2011 | Astely ......... | H04L 1/1607 370/252 |
| 2012/0327885 A1* | 12/2012 | Chung ......... | H04L 1/1614 370/329 |
| 2013/0016687 A1* | 1/2013 | Yang .......... | H04L 1/1614 370/329 |

* cited by examiner

*Primary Examiner* — Mang Yeung
(74) *Attorney, Agent, or Firm* — James M. Wu; JW Law Group

(57) ABSTRACT

An aspect of present invention discloses a transceiver processing hardware ("TPH") which is configured to process wireless information based on a constellation map. The TPH includes a minimum mean square error ("MMSE"), an inverse discrete Fourier transform ("IDFT"), and a demapper. The MMSE provides estimation of received bit stream, and the IDFT generates a list of samples associated with frequency of the bit stream. The demapper configured to discard unused constellation points includes a minimum function component ("MFC") and a special treatment component ("STC"). While MFC is able to receive a bit stream representing a symbol corresponding to a quadrature amplitude modulation ("QAM"), the STC is configured to force one or more infinity values to facilitate generation of an LLR value representing a logic value of the symbol.

19 Claims, 10 Drawing Sheets

METHOD AND APPARATUS FOR DISCARDING UNUSED POINTS FROM CONSTELLATION MAPPING RULE USING TRANSCEIVER PROCESSING HARDWARE ("TPH")

RELATED APPLICATION

This application is related to the following application assigned to the Assignee of the present invention.
a. Application Ser. No. 14/678,789, filed Apr. 3, 2015, entitled "Method and Apparatus for Handling Modified Constellation Mapping using a Soft Demapper," invented by Guzelgoz, and Kim, now issued into U.S. Pat. No. 9,509,362 B2.

FIELD

The exemplary embodiment(s) of the present invention relates to telecommunications network. More specifically, the exemplary embodiment(s) of the present invention relates to receiving and processing data stream via a wireless communication network.

BACKGROUND

With a rapidly growing trend of mobile and remote data access over a high-speed communication network such as 3G or 4G cellular services, accurately delivering and deciphering data streams become increasingly challenging and difficult. The high-speed communication network which is capable of delivering information includes, but not limited to, wireless network, cellular network, wireless personal area network ("WPAN"), wireless local area network ("WLAN"), wireless metropolitan area network ("MAN"), or the like. While WPAN can be Bluetooth or ZigBee, WLAN may be a Wi-Fi network in accordance with IEEE 802.11 WLAN standards.

To process information transmitted by radio frequency, various digital modulation schemes are used to generate symbols or bit streams based on constellation points or map. For example, the constellation map may include Quadrature Phase Shift Keying ("QPSK"), 16 QAM (quadrature amplitude modulation), or 64 QAM. A problem, however, associated with information processing based on constellation points is relatively low data integrity due to interference and noisy environment.

SUMMARY

The following summary illustrates a simplified version(s) of one or more aspects of present invention. The purpose of this summary is to present some concepts in a simplified description as more detailed description that will be presented later.

An aspect of present invention discloses a transceiver processing hardware ("TPH") which is configured to process wireless information based on a constellation map. The TPH includes a minimum mean square error ("MMSE"), an inverse discrete Fourier transform ("IDFT"), and a demapper. The MMSE provides estimation of received bit stream, and the IDFT generates a list of samples associated with frequency of the bit stream. The demapper configured to discard unused constellation points includes a minimum function component ("MFC") and a special treatment component ("STC"). While MFC is able to receive a bit stream representing a symbol corresponding to a quadrature amplitude modulation ("QAM"), the STC is configured to force one or more infinity values to facilitate generation of an LLR value representing a logic value of the symbol.

One aspect of the present invention discloses a network processing device containing a TPH to process data or bit streams. The TPH, in one example, includes a MMSE, an IDFT, and a demapper. While MMSE estimates received bit streams, IDFT is able to generate a list of samples associated with frequency of the bit stream. The demapper, in one aspect, is configured to demap one or more unused constellation points relating to the bit stream in light of the constellation mapping rules. The demapper further includes one or more MFCs and STC. MFCs are able to receive and compare bit stream(s) representing a symbol which corresponds to QAM. STC, in one aspect, is able to force infinity values to MFCs when the bit stream or stream of bits is identified as acknowledge ("ACK") or rank indicator ("RI") with a predefined encoding category.

Additional features and benefits of the exemplary embodiment(s) of the present invention will become apparent from the detailed description, figures and claims set forth below.

BRIEF DESCRIPTION OF THE DRAWINGS

The exemplary aspect(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
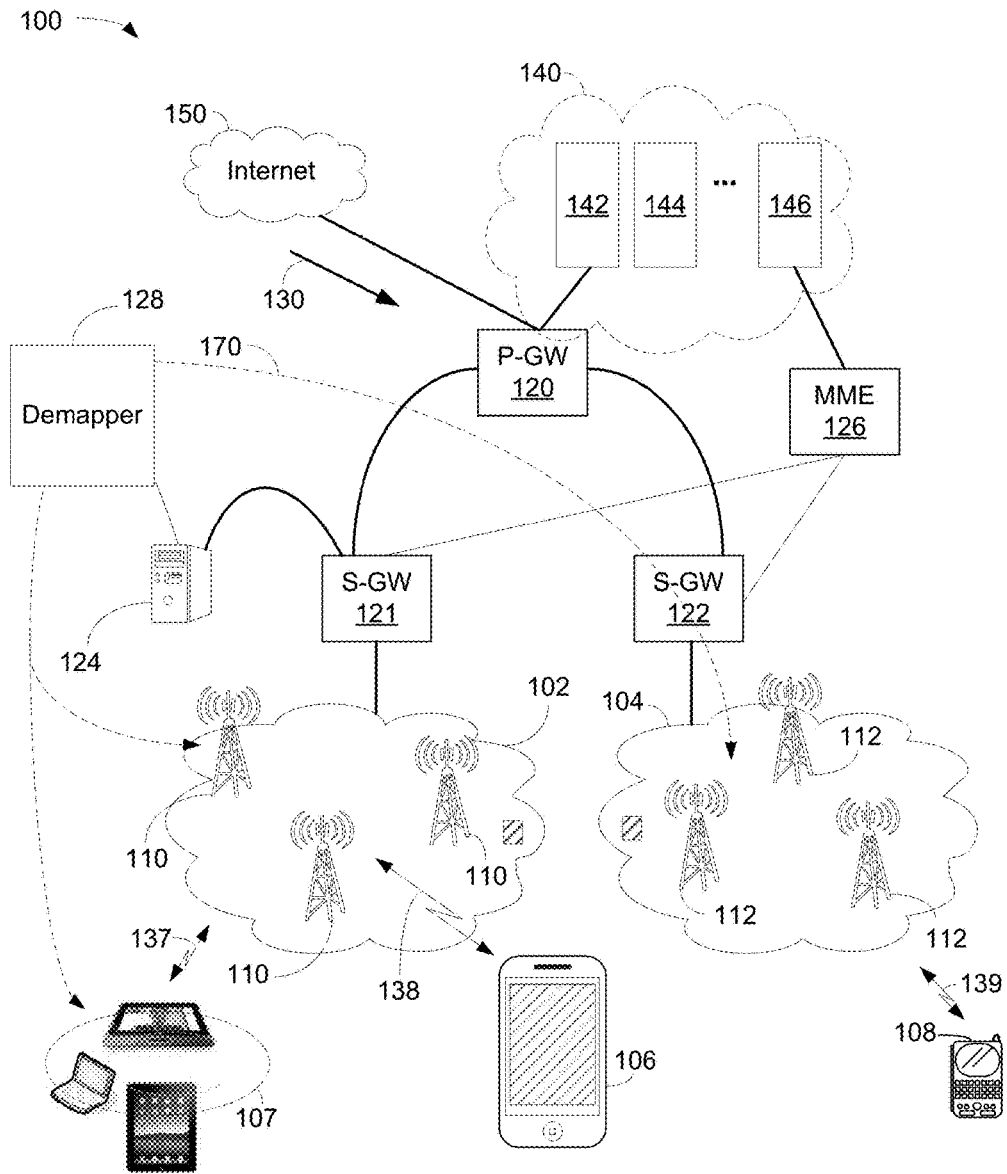
FIG. 1 is a block diagram illustrating a computing network configured to transmit data streams using a demapper in accordance with one embodiment of the present invention.

Aspects of the present invention are described herein the context of a method and/or apparatus for processing bit stream(s) using a demapper to improve data integrity.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

One aspect of the present invention discloses a network processing device such as a TPH which is able to wireless data stream(s) or bit stream(s) or stream of bits in accordance with the constellation mapping rules. TPH, in one example, includes an MMSE, IDFT, demapper, descrambler, combiner to modify certain constellation mapping rules for some control signals to improve accuracy of data processing. While MMSE provides estimation of transmit bit stream or symbol stream, IDFT generates a list of samples associated with frequency of bit stream. The demapper maps the MMSE processed symbols into soft bits. The demapper, in one aspect, includes one or more minimum function components ("MFCs") and special treatment component ("STC"). MFCs are able to receive bit stream, symbol stream, or I/Q stream representing a symbol which may correspond to QAM, i.e., 16 QAM or 64 QAM. STC, in one aspect, is able to force infinity values to MFCs when the bit stream is identified as ACK or RI with a predefined encoding category. Note that the terms "bit stream," "stream of bits," "symbol," "symbol stream," "constellation point," "I/Q bits," "I/Q component," and "I/Q data" refer to the same or substantially the same information and they can be used interchangeably.

FIG. 1 is a block diagram 100 illustrating a computing network configured to transmit data streams using demapper 128 in accordance with one embodiment of the present invention. Diagram 100 includes packet data network gateway ("P-GW") 120, two serving gateways ("S-GWs") 121-122, two base stations (or cell sites) 102-104, server 124, and Internet 150. P-GW 120 includes various components 140 such as billing module 142, subscribing module 144, and/or tracking module 146 to facilitate routing activities between sources and destinations. It should be noted that the underlying concept of the exemplary embodiment(s) of the present invention would not change if one or more blocks (or devices) were added to or removed from diagram 100.

The network configuration illustrated in diagram 100 may also be referred to as a third generation ("3G"), 4G, LTE, or combination of 3G and 4G cellular network configuration. Mobility management entity ("MME") 126, in one aspect, is coupled to base stations (or cell site) and S-GWs capable of facilitating data transfer between 3G and LTE (long term evolution) or between 2G and LTE. MME 126 performs various controlling/managing functions, network securities, and resource allocations.

S-GW 121 or 122, in one example, coupled to P-GW 120, MME 126, and base stations 102 or 104, is capable of routing data packets from base station 102, or eNodeB, to P-GW 120 and/or MME 126. A function of S-GW 121 or 122 is to perform an anchoring function for mobility between 3G and 4G equipments. S-GW 122 is also able to perform various network management functions, such as terminating paths, paging idle UEs, storing data, routing information, generating replica, and the like.

P-GW 120, coupled to S-GWs 121-122 and Internet 150, is able to provide network communication between user equipment ("UE") and IP based networks such as Internet 150. P-GW 120 is used for connectivity, packet filtering, inspection, data usage, billing, or PCRF (policy and charging rules function) enforcement, et cetera. P-GW 120 also provides an anchoring function for mobility between 3G and 4G (or LTE) packet core network(s).

Base station 102 or 104, also known as cell site, node B, or eNodeB, includes one or more radio towers 110 or 112. Radio tower 110 or 112 is further coupled to various UEs, such as a cellular phone 106, a handheld device 108, tablets and/or iPad® 107 via wireless communications or channels 137-139. Devices 106-108 can be portable devices or mobile devices, such as iPhone®, BlackBerry®, Android®, and so on. Base station 102 facilitates network communication between mobile devices such as UEs 106-107 with S-GW 121 via radio towers 110. It should be noted that base station or cell site can include additional radio towers as well as other land switching circuitry.

Server 124 is coupled to P-GW 120 and base stations 102-104 via S-GW 121 or 122. In one aspect, server 124 includes demapper 128 which is used to discard unused constellation points from a constellation map whereby it improves overall data integrity. For example, upon detecting a downstream push data 130 addressing to mobile device 106 which is located in a busy traffic area with considerable noise and interference, demapper 128 is configured to generate or demap soft information or soft bits associated with data 130 (i.e. bit stream representing a symbol(s)).

To improve accuracy of signal decoding or wireless information decoding, an approach for more accurate reading of a received signal is to use soft information. For instance, instead of traditional method of receiving and decoding signals using hard information, such as logic "1" or logic "zero", the soft information offers more information about the received signals, such as "strong 1," "relative strong 1," "relative weak 1," "strong 0," "relative strong 0," "relative weak 0," and the like. For example, with 8-bit soft information having a range from +127 to −127, the sign bit may be used to indicate logic "0" or logic "1" and the number following the sign bit indicates the likelihood logic value indicated by the sign bit. For example, assuming sign bit "+" indicates logic "0" and sign bit "−" indicates logic "1", +120 of the 8-bit soft information means a strong logic "0" while −016 indicates a weak logic "1".

Demapper 128, in one aspect, is able to demap, generate, or handle soft information based on received bit stream(s). Demapper 128 can also perform a discard function which is capable of discarding or ignoring certain unused constellation points from the constellation map to enhance readability of certain control signals such as ACK and/or RI. Note that ACK and RI are used to facilitate and/or manage wireless communication.

An advantage of using demapper 128 is that it is able to extract information from higher powered constellation points or corner points while discarding unused points from the constellation map to improve signal to interference plus noise ratio ("SINR") thereby overall data integrity is enhanced.

Figure 2:
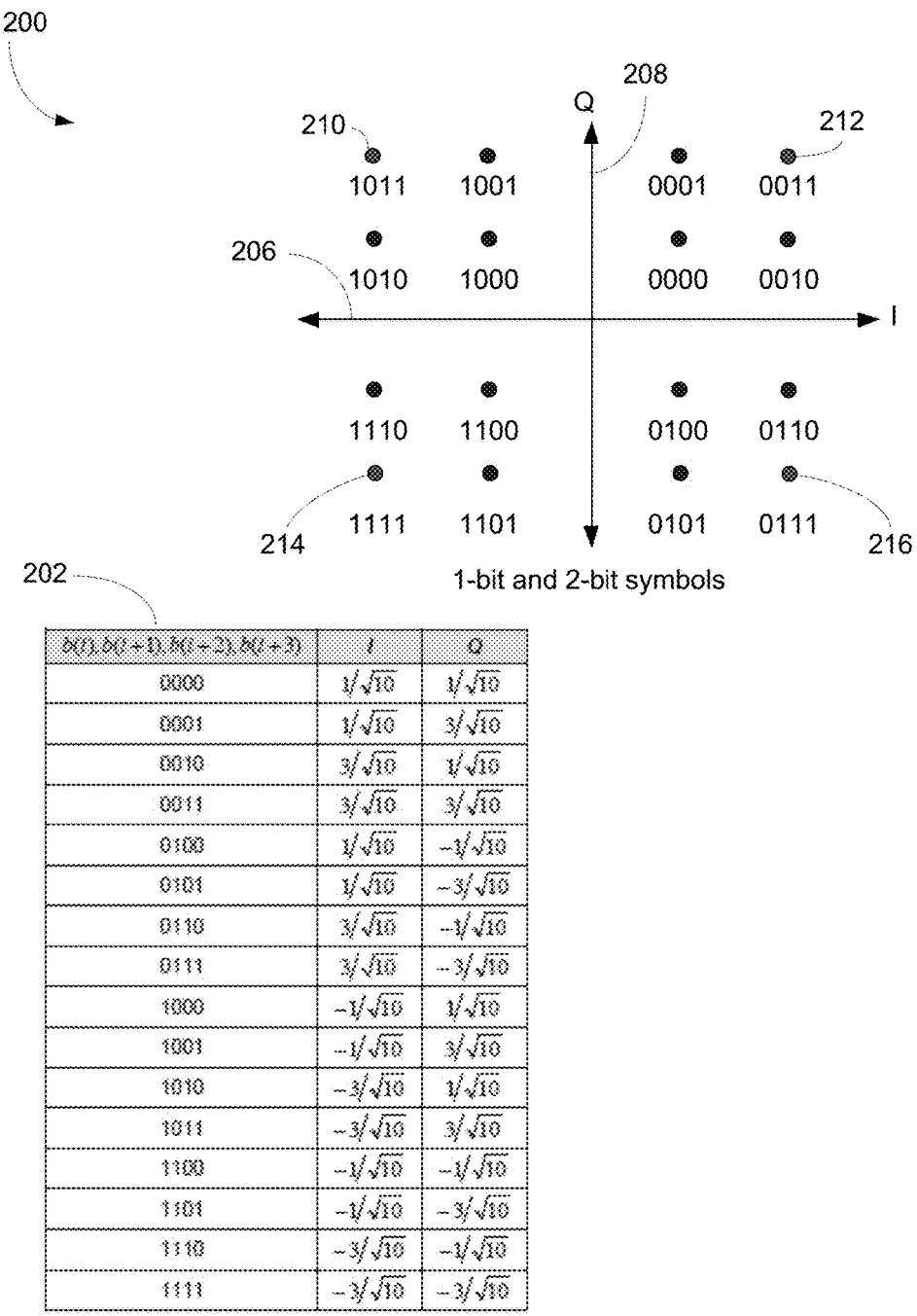
FIG. 2 is a block diagram showing an exemplary illustration for deciphering information from a 16 quadrature amplitude modulation ("QAM") constellation mapping in accordance with one embodiment of the present invention.

FIG. 2 is a block diagram 200 showing an exemplary illustration of a 16 QAM constellation map in accordance with one embodiment of the present invention. FIG. 2 illustrates a constellation map 200 and a table 202 which shows constellation points corresponding to constellation map 200. Constellation map 200, in one example, illustrates an x-axis labeled I 206 and a y-axis labeled Q 208. It should be noted that the underlying concept of the exemplary embodiment(s) of the present invention would not change if one or more points (or symbols) were added to or removed from constellation map 200.

Constellation map 200 includes sixteen (16) points that corresponds to 16 values as indicated by table 202. For example, the cross-point between the I-coordinate of $1/\sqrt{10}$ and the Q-coordinate of $1/\sqrt{10}$ indicates a logic value "0000" or "0" as shown in constellation map 200. Table 202 shows corresponding logic values associated to the points located on constellation map 200.

It should be noted that locations of the highest powered symbols are situated at corners of constellation map 200. For example, constellation points 210-216 should have the highest powered symbols on constellation map 200. The highest powered symbols generally provide the most accurate information since they are more immune to the interference and/or noisy environment.

In some scenarios, constellation mapping rule relating to certain symbols may be modified, adjusted, and/or changed, such as power boosting to improve data integrity. For instance, the symbols relating to 1-bit and/or 2-bit ACK/RI in LTE uplink can be such examples for power boosting. To enhance signal accuracy, symbols representing ACK or RI in one aspect can be mapped to the locations or points with the highest power in constellation map 200. Since the four (4) corner points on constellation map 200 possess the highest power, these corner constellation points are used for ACK and/or RI transmission whereby a higher SINR (signal to interface plus noise ratio) is likely to be obtained. When a special treatment is called for, the corner points are mapped to decipher control information while the unused points are discarded from constellation map 200. In one aspect, the demapper includes a special treatment component ("STC") which will be used to determine when a special treatment should be activated. For example, a control signal such as ACK or RI requires the special treatment.

An advantage of using the special treatment is to improve SINR for certain 1-bit or 2-bit control signals whereby more accurate information can be obtained.

Figure 3A:
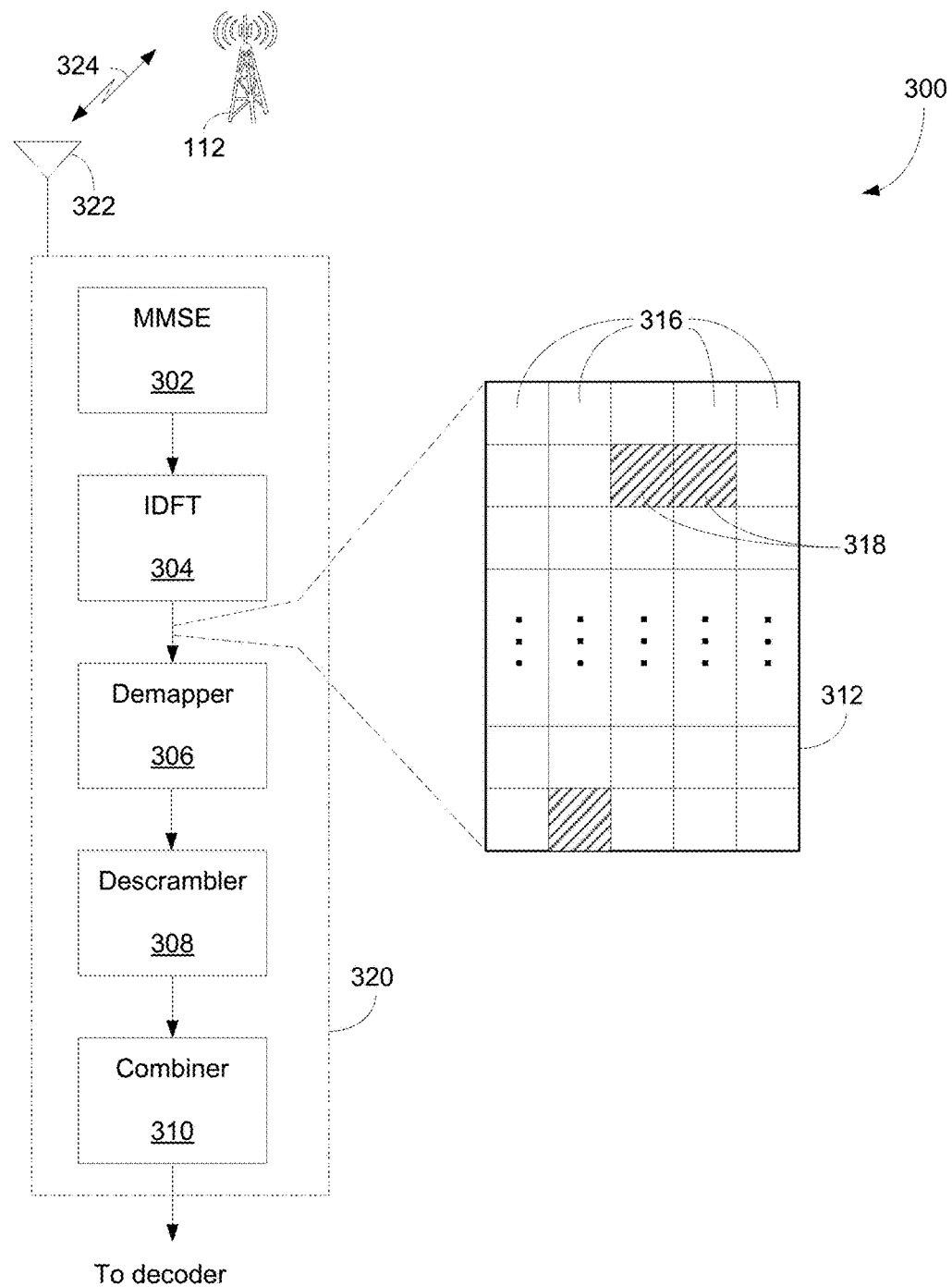
FIGS. 3A-B are block diagrams illustrating logic flows of data stream traveling through an FDEQ in accordance with one embodiment of the present invention.

FIG. 3A is a block diagram 300 illustrating a logic flow of a data stream traveling through TPH 320 including demapper 306 in accordance with one embodiment of the present invention. Diagram 300 includes TPH 320 and base station 112 which is capable of transmitting and receiving wireless signals 324 to and from TPH 320 via an antenna 322. It should be noted that the underlying concept of the exemplary embodiment(s) of the present invention would not change if one or more devices (or base stations) were added to or removed from diagram 300.

TPH 320, in one example, includes MMSE 302, IDFT 304, and demapper 306, and is able to process and/or handle information between antenna 322 and a decoder. The information includes data and control signals wherein the control signals are used to facilitate information transmission over a wireless communication network. While MMSE may include an estimator able to provide an estimation based on prior parameters and values associated with bit streams, IDFT 304 converts symbols or samples between frequency domains. After conversion, IDFT 304 may store the symbols or samples in a storage matrix 312. Depending on the applications, IDFT 304 can transmit the symbols to the next logic block such as demapper 308. Storage matrix 312 is a local storage memory which can reside in IDFT 304, demapper 306, or an independent storage location.

MMSE 302, in one example, includes an equalizer with serial interference cancellation ("SIC") capability and provides possible processing paths between TPH and SIC path. MMSE 302, which can be incorporated in TPH 320, generates estimated value using a function of mean-square-error or equalization of received signals or bit stream(s) during the signal processing phase. MMSE 302 also provides functionalities to equalize multiple streams of data received simultaneously over the air. For instance, the number of bit streams such as one (1) to eight (8) streams can arrive at antenna 322 simultaneously. MMSE 302 also supports frequency hopping and multi-cluster resource block ("RB") allocations. Note that the frequency offset may be used to compensate channel estimates before performing time interpolation. Time interpolation across multiple symbols may be performed in multiple modes.

Demapper 306, in one aspect, includes a first minimum function component ("MFC"), a second MFC, a special treatment component ("STC"), a subtractor, and/or an LLR generator. A function of demapper 306 is to demap or ascertain soft bit information associated to received symbol(s) or bit stream(s). For example, demapper 306 employs soft demapping principle which is based on computing the log-likelihood ratio (LLR) of a bit that quantifies the level of certainty as to whether it is a logical zero or one. To reduce noise and interference, demapper 306 is also capable of discarding one or more unused constellation points relating to the frequency of the bit stream from the constellation map.

The first MFC, in one example, is configured to receive a stream of bits representing a symbol corresponding to a QAM. The second MFC also receives the stream of bits with at least a portion of bits inverted. For example, while the first MFC receives an input such as 3I, the second MFC may receive an input such as −3I as an inverted value of 3I. The subtractor or subtractor component subtracts the output of the second MFC from the output of the first MFC. The LLR generator generates an LLR value representing a logic value of the symbol or the bit stream or a stream of bits according to the output of subtractor component and/or certain predefined offset value(s). Demapper 306, in one aspect, receives or fetches symbol from storage matrix 312.

The STC, in one aspect, is configured to force an infinity value as one input to the first MFC when the stream of bits is identified and a special treatment is needed. For example, a predefined control signal with a specific set of encoding categories such as ACK with a set of predefined encoding categories requires a special treatment. One of the special treatment, in one aspect, is to force infinity values as inputs to MFCs. For example, STC force infinity values as inputs to the first and the second MFCs when the stream of bits is identified as ACK or RI with a predefined encoding category. The STC, in one instance, is configured to determine whether a special treatment (or special treatment function) is required based on received bit stream or symbol(s). In one aspect, the 1-bit and 2-bit control signals with predefined encoding categories listed in Table 1 require special treatment(s).

TABLE 1

| No. | Control Signal with Encoding Categories | Renamed Categories |
|---|---|---|
| 1 | $O^{ACK} = 1$ | ACK [1] |
| 2 | $O^{ACK} = 1$ ACK bundling | ACK [2] |
| 3 | $O^{ACK} = 2$ | ACK [3] |
| 4 | $O^{ACK} = 2$ ACK bundling | ACK [4] |
| 5 | $O^{RI} = 1$ | RI [1] |
| 6 | $O^{RI} = 2$ | RI [2] |

Table 1 illustrates six (6) exemplary control signals with predefined encoding categories. To simplify forgoing description, six (6) control signals are renamed or referred to as ACK[1], ACK[2], ACK[3], ACK[4], RI[1], and RI[2], respectively. For example, 1-bit ACK "$O^{ACK}=1$" is referred to as ACK[1] and 1-bit ACK bundling is referred to as ACK[2]. 2-bit ACK "$O^{ACK}=2$" is referred to as ACK[3] and 2-bit ACK bundling is referred to as ACK[3]. Similarly, 1-bit RI "$O^{RI}=1$" is referred to as RI[1] and 2-bit RI "$O^{RI}=2$" is referred to as RI [2]. Note that ACK [1] indicates that ACK control signal with one (1) bit to indicate its value and ACK [3] indicates that ACK control signal uses two (2) bits to indicate its value. ACK bundling reduces the number of ACKs to be transferred in TDD-LTE (Time Division Duplexing LTE) networks by a logical AND operation between the ACKs belonging to multiple downlink subframes.

Storage matrix 312, which is a memory storage component (or device), is able to store multiple symbols in its storage space. Some symbols may be data while others may be control signals. The control signals, for example, may be ACK and/or RI with certain encoding categories. The symbols can be stored in storage matrix 312 by a data processing device in IDFT 304 or some other devices. A part of each symbol, in one example, is identified whether it represents data or control signal before it is stored in storage matrix 312. For example, storage cells 316 of storage matrix 312 contain data symbols representing data related information while storage cells 318 storages control signal symbols representing commands.

TPH 306 further includes a descrambler 308 and a combiner 310. Descrambler 308 is configured to generate and scramble a sequence of bits or a stream of bits. For example, after generating a sequence in accordance with the input value, the descrambler determines whether sequence modification is needed for certain categories of control information. The stream of bits or sequence is subsequently descrambled to produce a set of descrambled soft bits. Combiner 310 provides a combining function performing functions associated with channel quality indicator ("CQI"). It should be noted that TPH 306 can be used within any types of network system configured to handle wireless information.

Figure 3B:
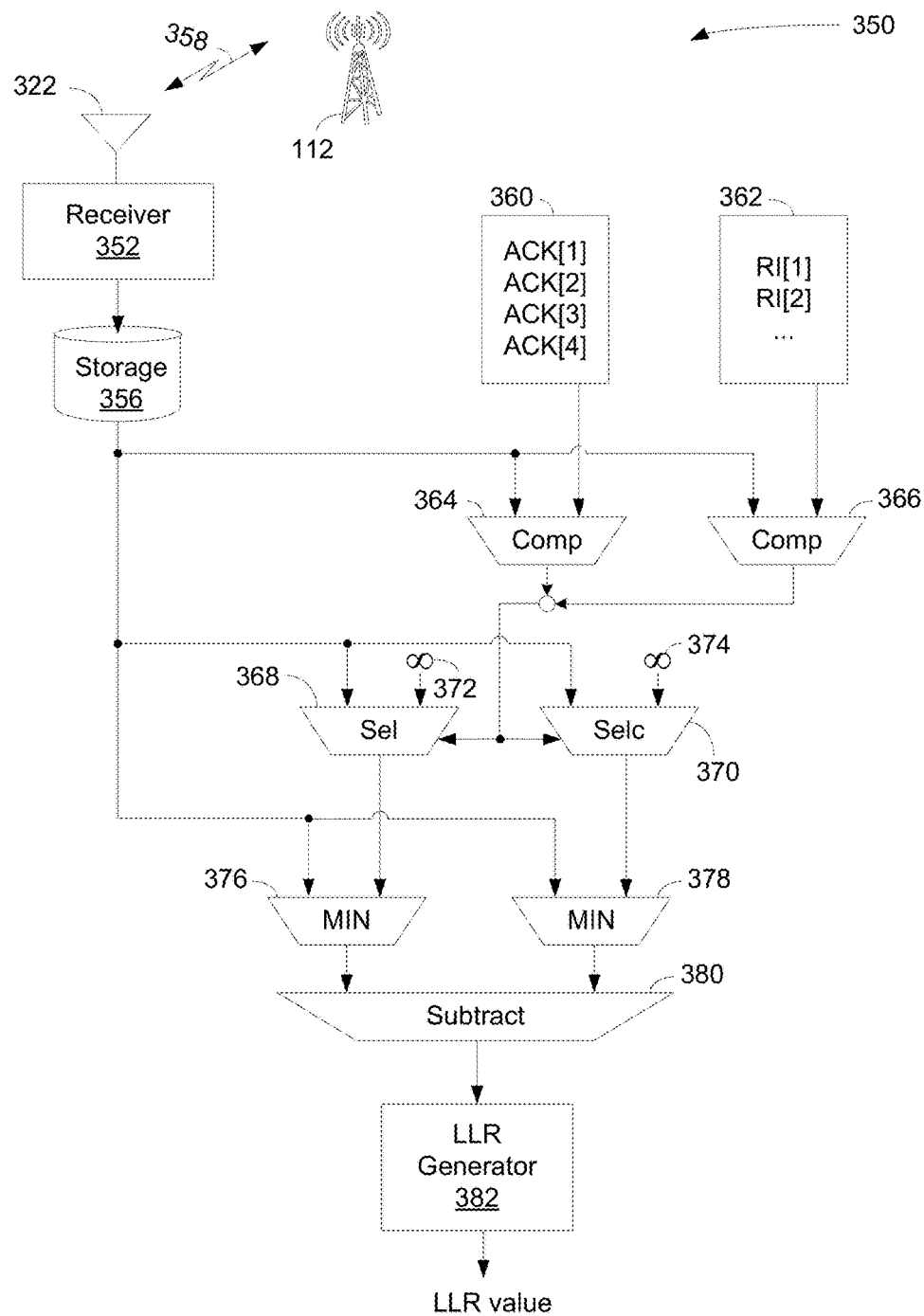

FIG. 3B is a block diagram 350 illustrating a logic flow showing a stream of data or symbols traveling through a demapper in accordance with one embodiment of the present invention. Diagram 350 illustrates a process of special treatment capable of deciphering symbol(s) received from a wireless communication network using constellation points located at the corner of constellation map. It should be noted that the underlying concept of the exemplary embodiment(s) of the present invention would not change if one or more devices (or components) were added to or removed from diagram 350.

After receipt of a bit stream 358 via antenna 322, bit stream 358 is sampled and stored in a storage or storage matrix 356. Once the symbol(s) representing bit steam(s) 358 is fetched from storage matrix 356, the fetched symbol (s) or bit stream(s) is used to identify whether special treatment(s) is necessary. In one example, two comparators 364-366 are used to compare the symbol with a set of pre-stored bit patterns of ACK [1, 2, 3, or 4] or RI [1 or 2] to determine whether a special treatment is needed. Note that the information relating to 1-bit or 2-bit ACK and RI with predefined encoding categories in memories 360-362 is initially stored. It should be noted that ACK and RI are exemplarily control signals and other 1-bit or 2-bit commands are also applicable for demapping as well as special treatment(s).

Upon identifying the symbol that is ACK and requiring special treatment, selectors 368-370 select two infinity input values 372-374 for discarding unused constellation points associated with the symbol from the constellation map. Note that removing or discarding unused constellation points can improve accuracy of demapping and SINR. After performing minimum functions via minimum components 376-378 according to the symbol and infinity input values 372-274, the outputs of components 376-378 are forwarded to subtractor 380. An LLR value representing ACK associated with the symbol is generated by an LLR generator 382.

Figure 4:
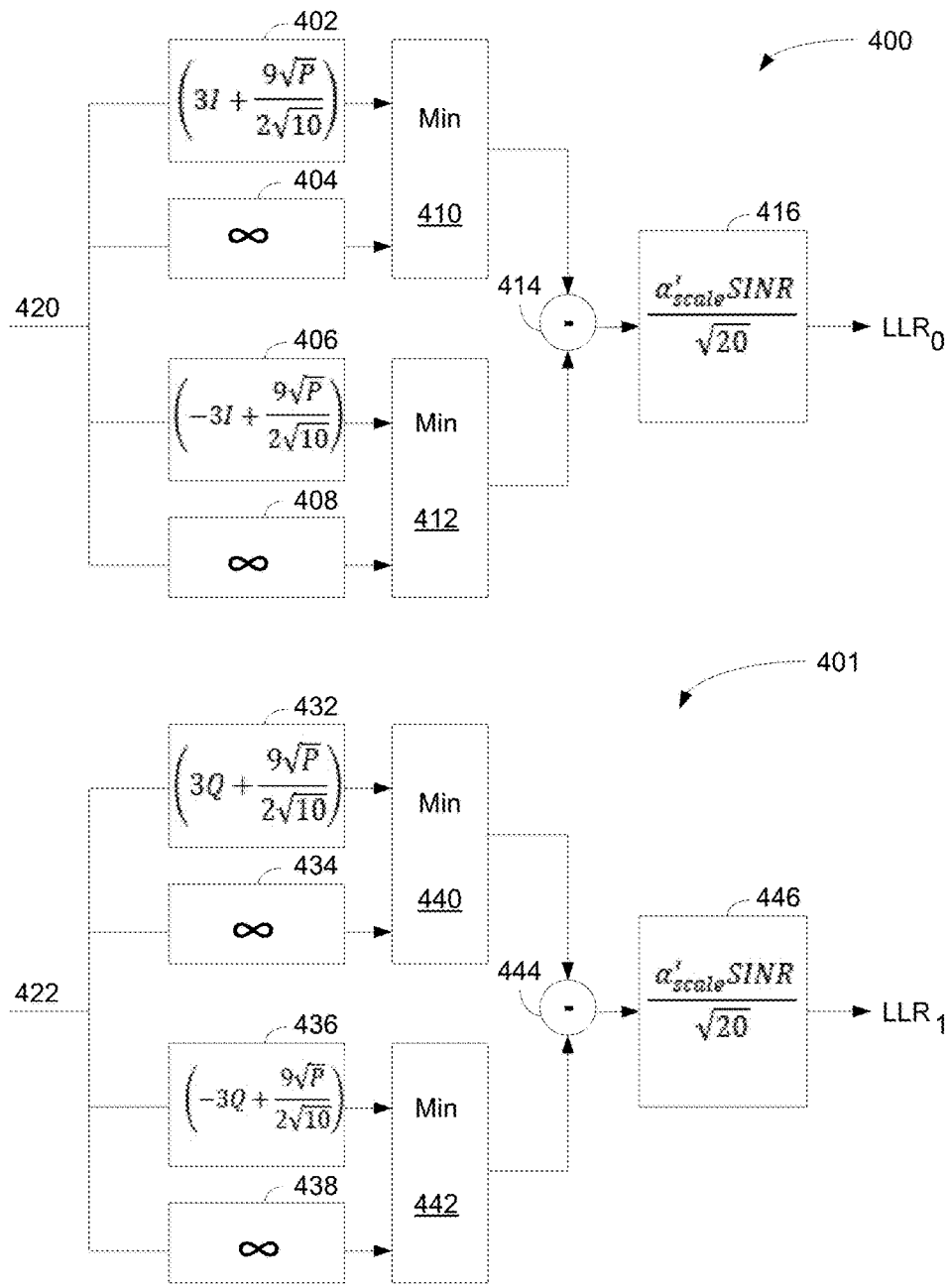
FIG. 4 are logic block diagrams illustrating a process of generating Log Likelihood Ratio ("LLR") value(s) using demapper in accordance with one embodiment of the present invention.

FIG. 4 illustrates a set of logic block diagrams 400-401 showing processes of generating LLR value(s) using a demapper in accordance with one embodiment of the present invention. Diagram 400 illustrates blocks including minimum functions 410-412, subtractor 414, and LLR generator 416 to generate an $LLR_0$ value in response to a stream of bits 420. Depending on the applications, minimum functions 410-412, subtractor 414, and LLR generator 416 can be implemented by hardware, software, firmware, or a combination of hardware, software, and/or firmware modules. Similarly, diagram 401 illustrates minimum functions 440-442, subtractor 444, and LLR generator 446 to generate an $LLR_1$ value in response to a stream of bits 422. Note that stream of bits 420 and 422 can be the same bit stream.

For a demapping operation, which is also known as soft demapping principle, it involves computing an LLR of a bit that quantifies the level of likelihood certainty as to whether the symbol represented by bit stream is a logical zero "0" or logic one "1". Under the assumption of Gaussian noise, LLR for the i-th bit can be calculated by the following formulae, $$LLR_i = \ln\left(\frac{P(bit_i = 0/r)}{P(bit_i = 1/r)}\right)$$

Where i represents i-th bit with respect to the value of 0 or 1.

LLR values can be calculated according to the received bit stream or symbol(s) using a modulation scheme, such as QPSK, 16 QAM, and/or 64 QAM. Note that QPSK, 16 QAM, or 64 QAM is exemplary modulation scheme in accordance with I and Q real and/or imaginary input samples. To simplify hardware complexity, one aspect of the invention adapts a simplified computing method to derive LLR values when a special treatment is needed. For example, if a special soft demapping feature is enabled, for 16QAM, $LLR_0$ and $LLR_1$ can be computed using the following formulae:

$$LLR_0 = \frac{\alpha'_{scale}SINR}{\sqrt{20}}\left(\min\left((\infty),\left(3I + \frac{9\sqrt{P}}{2\sqrt{10}}\right)\right) - \min\left((\infty),\left(-3I + \frac{9\sqrt{P}}{2\sqrt{10}}\right)\right)\right)$$

$$LLR_1 = \frac{\alpha'_{scale}SINR}{\sqrt{20}}$$
$$\left(\min\left((\infty),\left(3Q + \frac{9\sqrt{P}}{2\sqrt{10}}\right)\right) - \min\left((\infty),\left(-3Q + \frac{9\sqrt{P}}{2\sqrt{10}}\right)\right)\right)$$

For 64QAM, $LLR_0$ and $LLR_1$ would be computed using the following formulae:

$$LLR_0 = \frac{\alpha'_{scale}SINR}{\sqrt{84}}\left(\min\left((\infty),(\infty),(\infty),\left(7I + \frac{49\sqrt{P}}{2\sqrt{42}}\right)\right) - \min\left((\infty),(\infty),(\infty),\left(-7I + \frac{49\sqrt{P}}{2\sqrt{42}}\right)\right)\right)$$

$$LLR_1 = \frac{\alpha'_{scale}SINR}{\sqrt{84}}\left(\min\left((\infty),(\infty),(\infty),\left(7Q + \frac{49\sqrt{P}}{2\sqrt{42}}\right)\right) - \min\left((\infty),(\infty),(\infty),\left(-7Q + \frac{49\sqrt{P}}{2\sqrt{42}}\right)\right)\right)$$

where α' is an arbitrary scale and P is an average power of a constellation.

For an operation of 16 QAM, the process illustrated in diagram 400, for instance, can be implemented to derive an $LLR_0$ value when bit stream or symbol 420 is identified as a 1-bit or 2-bit control signal such as ACK and RI with a predefined encoding category. For $LLR_1$ value, the process illustrated in diagram 401 is processed when symbol 422 is identified as a 1-bit or 2-bit control signal. In one aspect, the control signal with a predefined encoding category includes ACK[1], ACK[2], ACK[3], ACK[4], RI[1], and RI[2]. It should be noted that QAM can be considered both analog and digital modulation in which it may use amplitude-shift keying modulation scheme.

To obtain $LLR_0$, input 402, for example, is calculated based on symbol 420 and input 406 is calculated according to symbol 420 with a portion of value inverted such as "−3I". Inputs 404 and 408 are forced to infinity values ("∞"). The $LLR_0$ value is subsequently generated based on scaling values 416 and subtraction between outputs of minimum functions 410-412. Similarly, to calculate $LLR_1$, input 432 is calculated based on symbol 422 and input 436 is calculated according to symbol 422 with a portion of value inverted such as "−3Q". Inputs 434 and 438 are set to infinity values. $LLR_1$ is subsequently generated based on scaling values 446 and subtraction between outputs of minimum functions 440-442.

Figure 5:
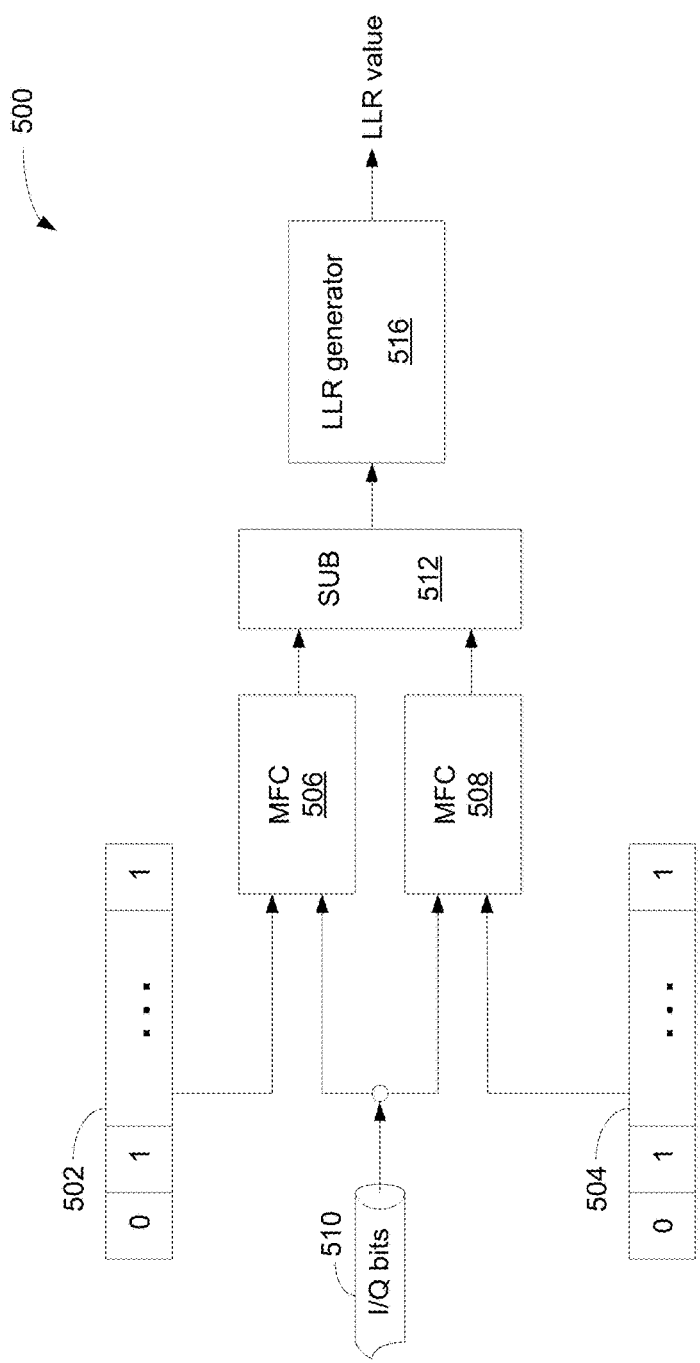
FIG. 5 is a logic block diagram illustrating a process of generating LLR value using demapping in accordance with one embodiment of the present invention.

FIG. 5 is a logic block diagram 500 illustrating a process of generating LLR value using demapping in accordance with one embodiment of the present invention. Diagram 500, which contains similar components as illustrated in FIG. 4, includes a first MFC 506, a second MFC 508, a subtractor 512, an LLR generator 516, and infinity input values 502-504. It should be noted that the underlying concept of the exemplary embodiment(s) of the present invention would not change if one or more devices (or components) were added to or removed from diagram 500.

First MFC 506 receives a stream of bits 510 representing a symbol corresponding to QAM and second MFC 508 receives stream of bits 510 with at least a portion of bits inverted. Stream of bits or bit stream 510, in one example, can also be referred to as I/Q bits, I/Q components, and/or I/Q information. The STC forces infinity values 502-504 as inputs to MFCs 506-508 when stream of bits 510 is identified as ACK with encoding category one (1), ACK with encoding category two (2), ACK with encoding category three (3), or ACK with encoding category four (4). Subtractor or subtractor component 512 subtracts the outputs between MFCs 506-508. Note that infinity value 502 or 504 can be represented as "011111 . . . 1" as in binary format. The output of substracter 512 is used to generate LLR value by LLR generator 516.

Figure 6:
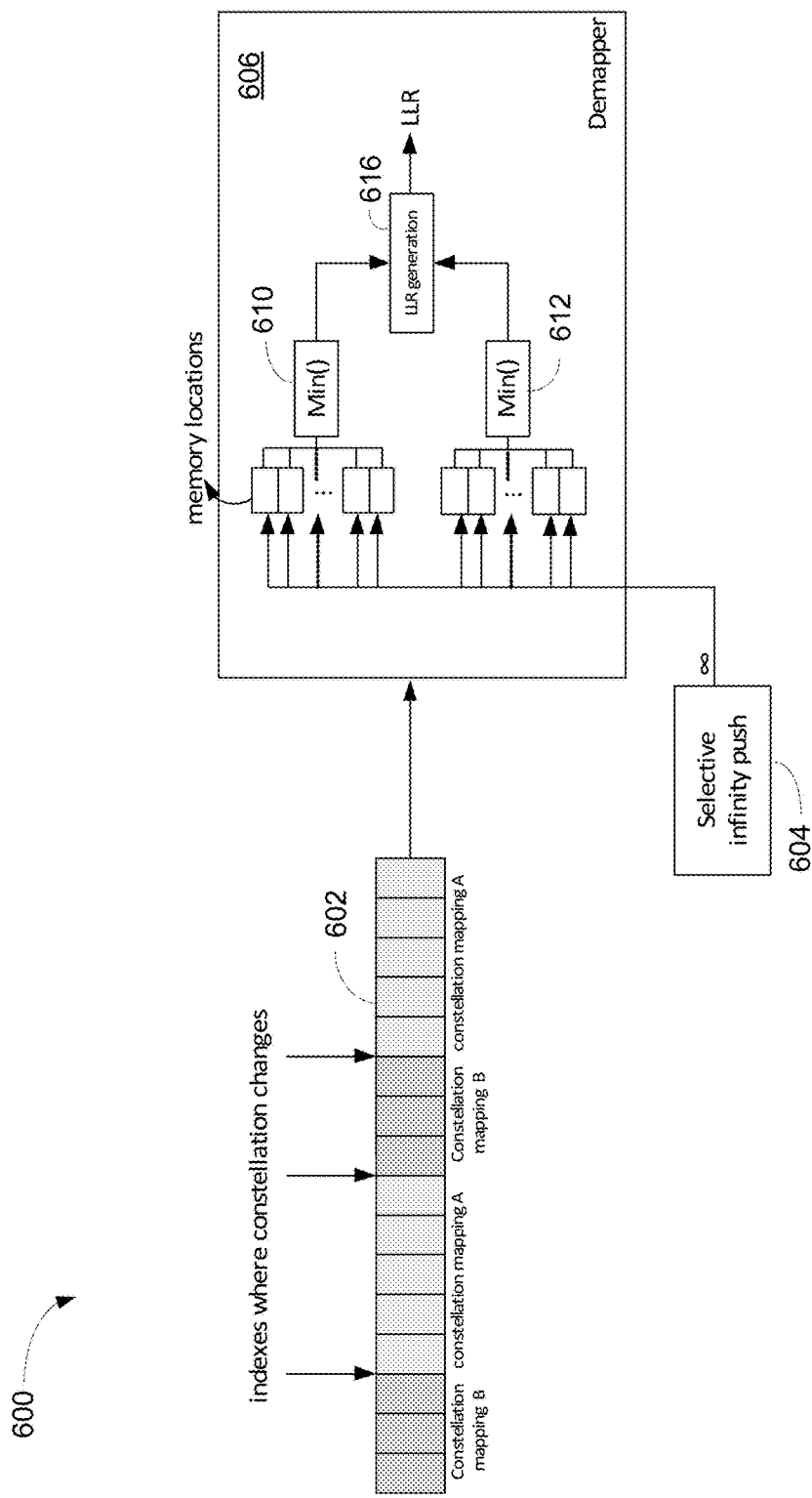
FIG. 6 is a block diagram illustrating an exemplary process of providing an LLR value using infinity values to demap unused constellation points in accordance with one embodiment of the present invention.

FIG. 6 is a block diagram 600 illustrating an exemplary process of providing an LLR value using infinity values to manage and/or ignore unused constellation points in accordance with one embodiment of the present invention. Diagram 600 includes input symbols 602, infinity pusher 604, and demapper 606 wherein demapper 606 also includes MFCs (or Mins) 610-612 and LLR generator 616. Input symbols 602 include data and control signals. It should be noted that the underlying concept of the exemplary embodiment(s) of the present invention would not change if one or more devices (or components) were added to or removed from diagram 600.

Demapper 606 illustrates implementation of algorithms such as log-map and max-log-map to decipher symbols. Note that the algorithms or methods derive the minimum distance between the received symbol and all possible constellation points. In one aspect, metrics corresponding to constellation points that are unused by the mapping rule can be set to infinity prior to comparison operation (i.e., Min( )

610-612). Once symbol 602 is known to be coming from the different mapping rule, selective infinity push module or infinity pusher 604 replaces some variables with infinity values to make certain that these values will not be selected by the min( ) operation performed by MFCs (or Min( ) 610-612.

In one example, demapper 606 is configured to discard one or more unused constellation points relating to the frequency of the bit stream from a constellation map. Demapper 606 includes MFCs or Mins( ) 610-612, STC, and LLR generator 616. MFC 610, in one example, receives a stream of bits 602 as one input value which represents a symbol corresponding to 16 QAM. MFC 612 is configured to receive the stream of bits as one input value which includes at least a portion of bits inverted. Selective infinity push module 604 is able to force infinity values to both MFCs 610-612 as second inputs for performing a minimum operation when the stream of bits is identified as RI with a predefined encoding category. Note that the RI with a predefined encoding category can be either RI with encoding category one (1) or RI with encoding category two (2). LLR generator 616 subsequently generates an LLR value representing value of RI in response to stream of bits or symbol(s) 602 as well as other values such as scaling value(s).

Figure 7:
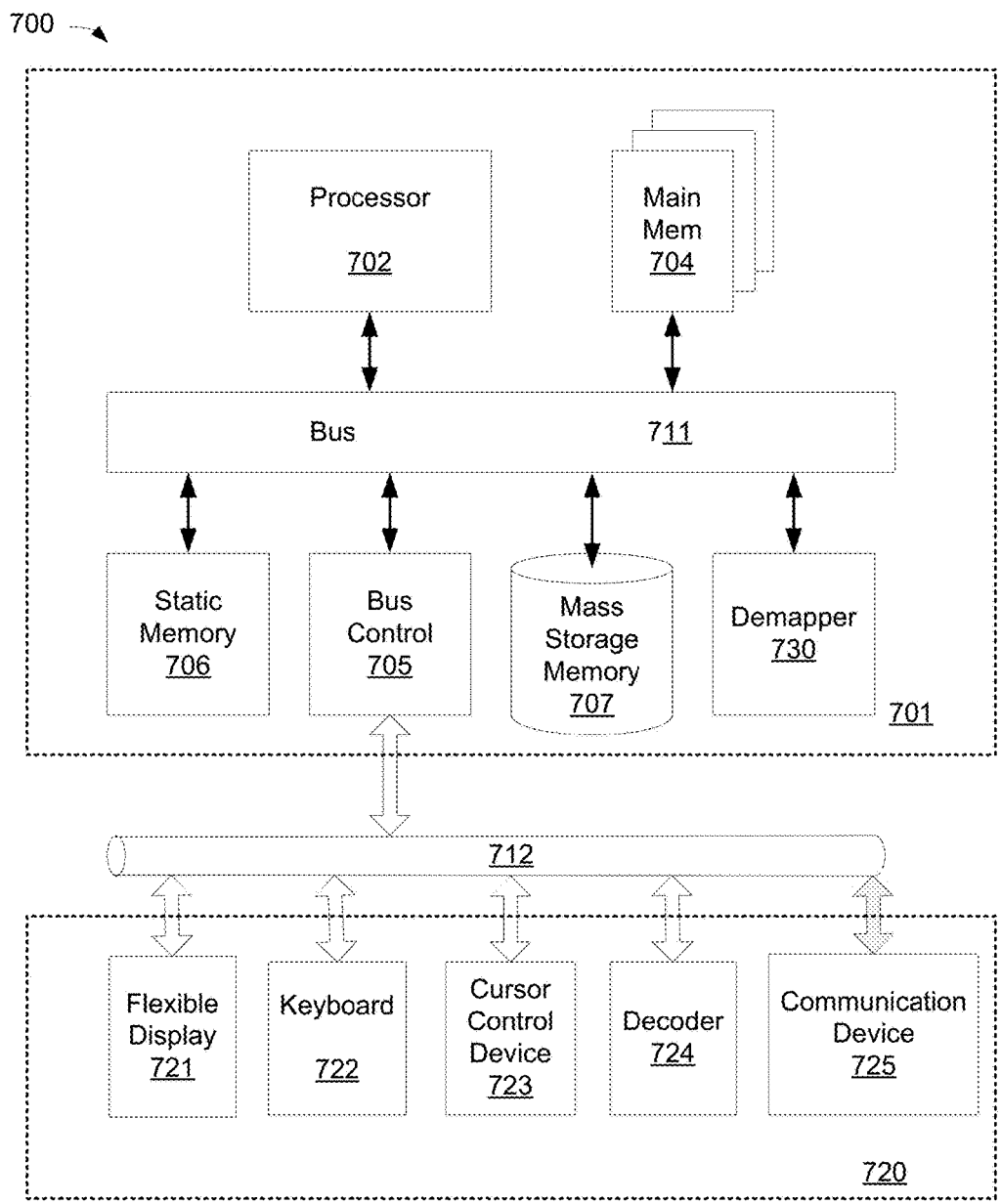
FIG. 7 is a block diagram illustrating an exemplary system capable of providing a demapping operation in accordance with one embodiment of the present invention.

Having briefly described aspect of demapper able to map high powered corner constellation points while demapping unused points in which the exemplary aspect of present invention operates, FIG. 7 illustrates an example of a digital computing system 700 with feature of demapping may be implemented. It will be apparent to those of ordinary skill in the art that other alternative computer system architectures may also be employed.

Computer system 700 includes a processing unit 701, an interface bus 712, and an input/output ("IO") unit 720. Processing unit 701 includes a processor 702, main memory 704, system bus 711, static memory device 706, bus control unit 705, and mass storage memory 707. Bus 711 is used to transmit information between various components and processor 702 for data processing. Processor 702 may be any of a wide variety of general-purpose processors, embedded processors, or microprocessors such as ARM® embedded processors, Intel® Core™2 Duo, Core™2 Quad, Xeon®, Pentium™ microprocessor, AMD® family processors, MIPS® embedded processors, or Power PC™ microprocessor.

Main memory 704, which may include multiple levels of cache memories, stores frequently used data and instructions. Main memory 704 may be RAM (random access memory), MRAM (magnetic RAM), or flash memory. Static memory 706 may be a ROM (read-only memory), which is coupled to bus 711, for storing static information and/or instructions. Bus control unit 705 is coupled to buses 711-712 and controls which component, such as main memory 704 or processor 702, can use the bus. Mass storage memory 707 may be a magnetic disk, solid-state drive ("SSD"), optical disk, hard disk drive, floppy disk, CD-ROM, and/or flash memories for storing large amounts of data.

I/O unit 720, in one example, includes a display 721, keyboard 722, cursor control device 723, decoder 724, and communication device 725. Display device 721 may be a liquid crystal device, flat panel monitor, cathode ray tube ("CRT"), touch-screen display, or other suitable display device. Display 721 projects or displays graphical images or windows. Keyboard 722 can be a conventional alphanumeric input device for communicating information between computer system 700 and computer operator(s). Another type of user input device is cursor control device 723, such as a mouse, touch mouse, trackball, or other type of cursor for communicating information between system 700 and user(s).

Communication device 725 is coupled to bus 711 for accessing information from remote computers or servers through wide-area network. Communication device 725 may include a modem, a router, or a network interface device, or other similar devices that facilitate communication between computer 700 and the network. In one aspect, communication device 725 is configured to perform wireless functions. Alternatively, demapper 730 and communication device 725 perform the demapping function(s) in accordance with one embodiment of the present invention.

Demapper 730, in one aspect, is coupled to bus 711 and is configured to perform map and demap functions associated with processing wireless information. Demapper 730 can be hardware, software, firmware, or a combination of hardware, software, and firmware.

The exemplary aspect of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 8:
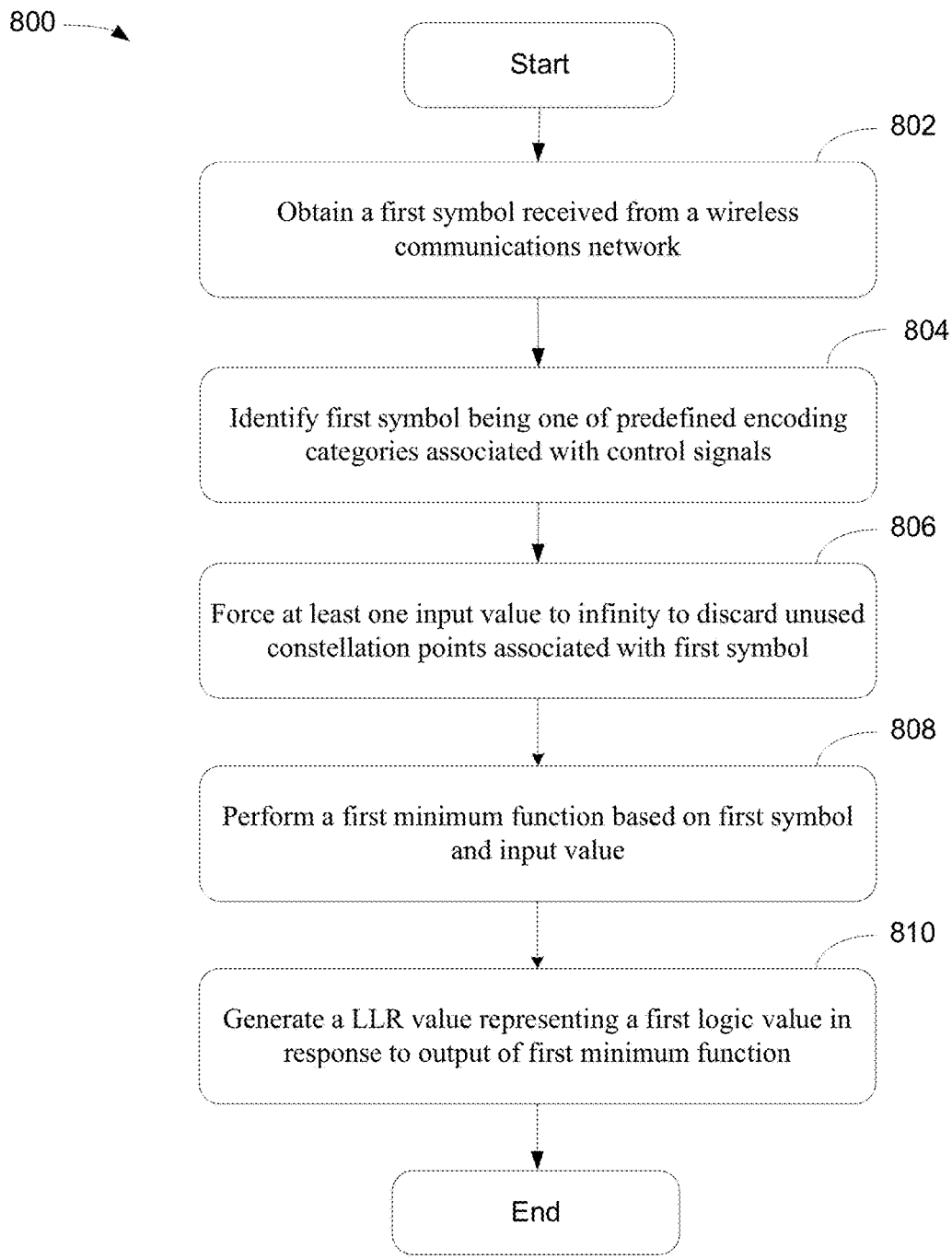
FIG. 8 is a flowchart illustrating a process of deciphering wireless information using a demapper in accordance with one embodiment of the present invention.

FIG. 8 is a flowchart 800 illustrating a process of deciphering wireless information using a demapper in accordance with one embodiment of the present invention. At block 802, a demapping process capable of processing data received from a wireless communications network obtains a first symbol from a storage matrix. For example, upon receiving the first bit stream broadcasted by a base station via an antenna, an MMSE component estimates digital values associated with the first bit stream using a method of average squares of error. After converting the estimated output of the first bit stream, an inverse discrete Fourier transformer ("IDFT") converts output of the MMSE component to a frequency domain. The output of IDFT including the first symbol is stored to the storage matrix. In one example, the process is capable of retrieving information from a storage based on QAM related constellation points.

At block 804, the first symbol is identified as one of the predefined encoding categories associated with one or more control signals. The control signals, such as ACK and RI, are used for managing and facilitating data transfer over the wireless communications network. In one aspect, the first symbol is identified as ACK or ACK control signal with encoding category one (1) (i.e., ACK [1]). Alternatively, the first symbol can be one of ACK with encoding category two (2), ACK with encoding category three (3), or ACK with encoding category four (4) (i.e., ACK [2], ACK [3], or ACK [4]). In another aspect, the first symbol is RI with encoding category one (1) or RI with encoding category two (2) (i.e., RI [1] or RI [2]).

At block 806, the process, in one aspect, is capable of forcing at least one input value to infinity to discard unused constellation points associated with the first symbol in accordance with a mapping rule. For example, two infinity values can be set as input values to the two minimum components when the first symbol is associated with 16 QAM constellation points. Alternatively, six (6) infinity values can be set as input values when the first symbol is associated with 64 QAM constellation points.

At block 808, the first minimum function is performed based on the first symbol and the infinity value and, similarly, a second minimum function is also performed based on an inverted value of at least a portion of first symbol and the infinity value. The output of the second minimum function, in one aspect, is subtracted from the output of the first minimum function.

At block 810, an LLR value representing a first logic value of the first symbol is generated according to the output of the subtraction between the outputs of the first and the second minimum functions. Also, the process is able to obtain a second symbol from the storage memory. After identifying the second symbol as ACK [2], at least two input values are forced to infinity which will be used to discard unused constellation points associated with the second symbol. Upon performing a minimum function via the minimum component based on the second symbol and the infinity values, a second LLR value representing a second logic value associated with the second symbol is generated in response to output of the minimum component and an LLR generator.

Figure 9:
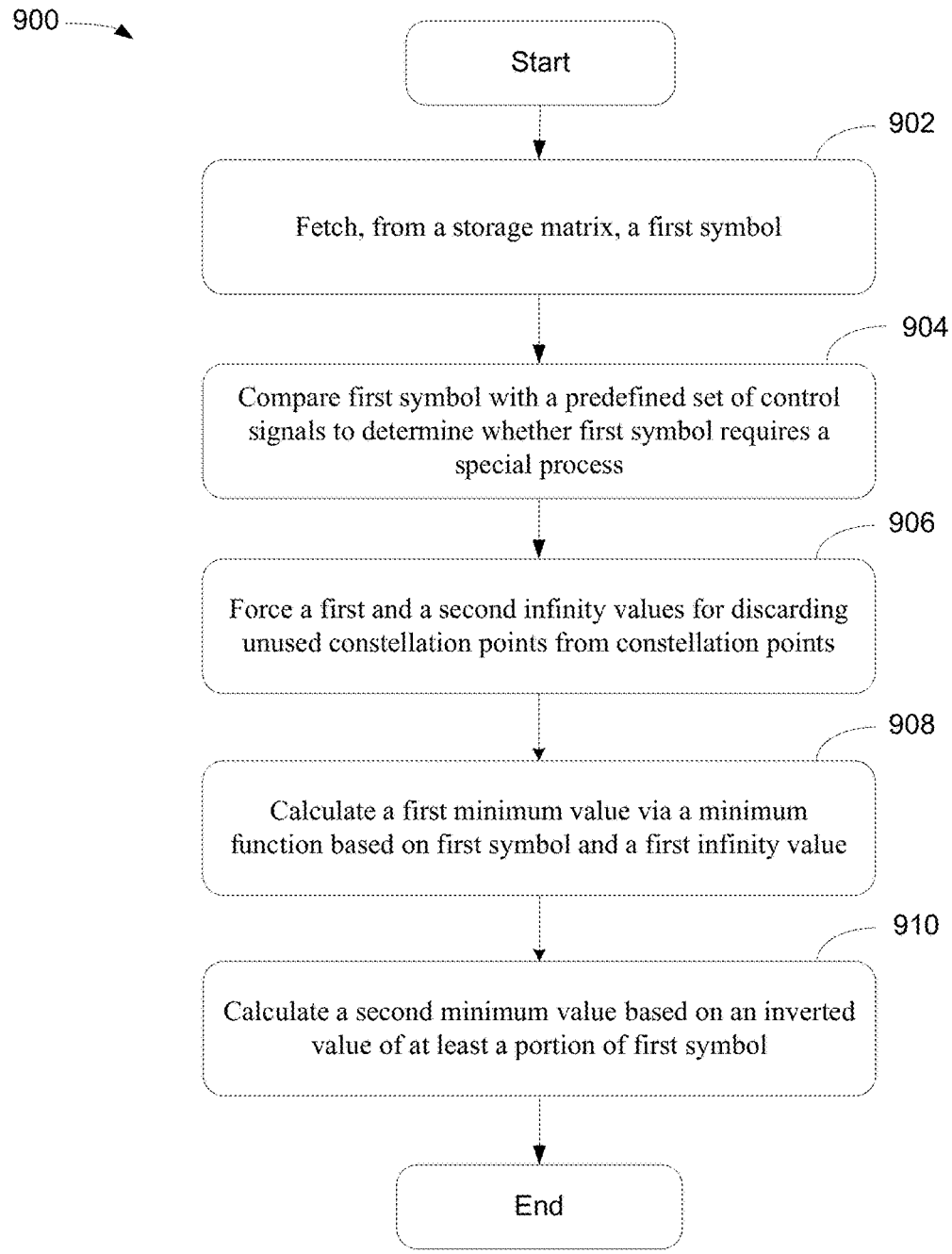
FIG. 9 is a flowchart illustrating a process of performing a demapping function using minimum values in accordance with one embodiment of the present invention.

FIG. 9 is a flowchart 900 illustrating a process of performing a demapping function using minimum values in accordance with one embodiment of the present invention. At block 902, a process configured to discard unused constellation points obtains a symbol from a storage matrix. It should be noted that the symbol can be associated with 16 QAM, 32 QAM, 64 QAM, or the like.

At block 904, the symbol is compared with a predefined set of control signals to determine whether the symbol is a predefined control signal that may require a special treatment or special process. For example, the symbol can be ACK with encoding category one (1), ACK with encoding category two (2), ACK with encoding category three (3), or ACK with encoding category four (4). Alternatively, the symbol can also be RI with encoding category one (1) or RI with encoding category two (2).

At block 906, the process forces a first infinity value and a second infinity value as inputs to minimum function modules for discarding unused constellation points from the constellation map when the first symbol matches with one of the predefined set of control signal, such as ACK[1], ACK[2], ACK[3], ACK[4], RI[1], or RI[2].

At block 908, after forcing the infinity values, a first minimum value is calculated via a minimum function based on the symbol and the first infinity value.

At block 910, a second minimum value is calculated based on an inverted value of at least a portion of the symbol and a second infinity value. After subtracting the second minimum value from the first minimum value, an LLR value representing a logic value or digital value of the symbol is generated.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A transceiver processing hardware ("TPH") configured to processing data, comprising:
a minimum mean square error ("MMSE") component able to provide estimation of received bit stream;
an inverse discrete Fourier transformer ("IDFT") coupled to the MMSE and configured to generate a list of samples associated with frequency of the bit stream; and
a demapper coupled to the IDFT and configured to discard one or more unused constellation points relating to the frequency of the bit stream, wherein the demapper includes,
a first minimum function component ("MFC") configured to receive a stream of bits representing a symbol corresponding to a quadrature amplitude modulation ("QAM");
a special treatment component ("STC") coupled to the first MFC and configured to force an infinity value as one input to the first MFC when the stream of bits is identified as an acknowledge ("ACK") signal with a predefined encoding category.

2. The TPH of claim 1, wherein the demapper further includes a second MFC coupled to the first MFC and configured to receive the stream of bits with at least a portion of bits inverted.

3. The TPH of claim 2, wherein the demapper further includes a subtractor component coupled to the first MFC and configured to subtract output of the second MFC from output of the first MFC.

4. The TPH of claim 3, wherein the demapper further includes a log likelihood ratio ("LLR") generator coupled to the subtractor component and configured to generate a LLR value representing the stream of bits in response to output of the subtract component and scaling value.

5. The TPH of claim 2, wherein the STC is configured to force an infinity value as one input to the second MFC when the stream of bits is identified as an ACK signal with a predefined encoding category.

6. The TPH of claim 1, wherein the ACK signal with a predefined encoding category includes one of an ACK category one (1), an ACK category two (2), an ACK category three (3), and an ACK category four (4).

7. The TPH of claim 1, wherein the demapper includes:
a descrambler coupled to the demapper and configured to generate and scramble a sequence of bits; and
a combiner coupled to the descrambler and configured to provide a combining function associated with a channel quality indicator ("CQI").

8. A transceiver processing hardware ("TPH") configured to processing data, comprising:
a minimum mean square error ("MMSE") component able to provide estimation of received bit stream;
an inverse discrete Fourier transformer ("IDFT") coupled to the MMSE and configured to generate a list of samples associated with frequency of the bit stream; and
a demapper coupled to the IDFT and configured to discard one or more unused constellation points relating to the frequency of the bit stream, wherein the demapper includes,
a first minimum function component ("MFC") configured to receive a stream of bits representing a symbol corresponding to a quadrature amplitude modulation ("QAM");
a special treatment component ("STC") coupled to the first MFC and configured to force an infinity value as one input to the first MFC when the stream of bits is identified as a rank indicator ("RI") with a predefined encoding category.

9. The TPH of claim 8, wherein the demapper further includes:
a second MFC coupled to the first MFC and configured to receive the stream of bits with at least a portion of bits inverted; and
a subtractor component coupled to the first MFC and configured to subtract an output of the second MFC from an output of the first MFC.

10. The TPH of claim 9, wherein the STC is configured to force an infinity value as one input to the second MFC when the stream of bits is identified as RI with a predefined encoding category.

11. The TPH of claim 9, wherein the demapper further includes a log likelihood ratio ("LLR") generator coupled to the subtractor component and configured to generate an LLR value representing a value of RI in response to an output of the subtractor component and a LLR scaling value.

12. The TPH of claim 8, wherein the RI with a predefined encoding category includes one of a RI category one (1) and a RI category two (2).

13. The TPH of claim 8, wherein the demapper further includes:
a descrambler coupled to the demapper and configured to generate and scramble a sequence of bits; and
a combiner coupled to the descrambler and configured to provide a combining function associated with a channel quality indicator ("CQI").

14. A method for processing data from a network, comprising:
fetching, from a storage matrix, a first symbol received from a wireless communications network;
identifying the first symbol being an acknowledge ("ACK") signal with one of predefined encoding categories;
generating at least two infinity input values to discard unused constellation points associated with the first symbol to reduce noise interference;
performing minimum functions via minimum components based on the first symbol and the at least two infinity input values; and
generating a Log Likelihood Ratio ("LLR") value representing an ACK value in response to outputs of the minimum functions.

15. The method of claim 14, further comprising:
receiving a first bit stream broadcasted from a base station via an antenna of a receiver; and
estimating the first bit stream with average squares of error via a minimum mean square error ("MMSE") component.

16. The method of claim 15, further comprising:
converting estimated first bit stream output from the MMSE component to a frequency domain via a discrete Fourier transformer ("DFT"); and
storing an output of DFT as the first symbol into the storage matrix.

17. The method of claim 14, further comprising subtracting an output of second minimum function from output of first minimum function.

18. The method of claim 14, wherein obtaining, from a storage matrix, a first symbol is retrieving information from a storage based on quadrature amplitude modulation ("QAM") related constellation points.

19. The method of claim 14, wherein identifying the first symbol being an ACK with one of predefined encoding categories includes determining one of an ACK encoding category one (1), an ACK encoding category two (2), an ACK encoding category three (3), and an ACK encoding category four (4).

* * * * *